United States Patent
Kim

(10) Patent No.: US 9,871,262 B2
(45) Date of Patent: Jan. 16, 2018

(54) APPARATUS AND METHOD FOR MEASURING INTERNAL OHMIC RESISTANCE OF FUEL CELL SYSTEM

(71) Applicant: Hyundai Motor Company, Seoul (KR)

(72) Inventor: Jae Hoon Kim, Suwon-si (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 511 days.

(21) Appl. No.: 14/106,144

(22) Filed: Dec. 13, 2013

(65) Prior Publication Data

US 2015/0050524 A1 Feb. 19, 2015

(30) Foreign Application Priority Data

Aug. 16, 2013 (KR) .................. 10-2013-0097065

(51) Int. Cl.
*H01M 8/04* (2016.01)
*H01M 8/04537* (2016.01)

(52) U.S. Cl.
CPC ... *H01M 8/04552* (2013.01); *H01M 8/04559* (2013.01)

(58) Field of Classification Search
None
See application file for complete search history.

(56) References Cited

U.S. PATENT DOCUMENTS

2004/0175602 A1* 9/2004 Tahara ............... H01M 8/04119 429/431

FOREIGN PATENT DOCUMENTS

| JP | 2008-041646 A | 2/2008 |
| JP | 2010-118151 A | 5/2010 |
| JP | 2012-167978 A | 9/2012 |
| KR | 10-2007-0097623 A | 10/2007 |
| KR | 10-2008-0000657 A | 1/2008 |

OTHER PUBLICATIONS

S. Ji, et al., "Study on Ohmic Resistance of Polymer Electrolyte Fuel Cells Using Current Interruption Method," Trans. Korean Soc. Mech. Eng. B., vol. 37, No. 4, pp. 353-358, 2013.
A. Emadi, et al., "Topological Overview of Hybrid Electric and Fuel Cell Vehicular Power System Architectures and Configurations," IEEE Transactions on Vehicular Technology, vol. 54, No. 3, pp. 763-770, May 2005.
"Evaluation and Analysis Method of Power Generation Characteristics of Fuel Cell", Seahwa High Tech Co., Ltd., (c) 2004. (w/ English translation).

* cited by examiner

*Primary Examiner* — Tracy Dove
(74) *Attorney, Agent, or Firm* — McDermott Will & Emery LLP

(57) ABSTRACT

An apparatus and a method for measuring the internal ohmic resistance of a fuel cell system, in which the resistance can be easily measured through a current interruption method even while the fuel cell system is operated. An interrupter and an external energy consumption device are connected in parallel to each other between a fuel cell and a main energy consumption device such that current to the external energy consumption device is applied and interrupted by switching the interrupter on/off even while the fuel cell system is maintained in operation as is, thereby making it possible to easily measure the internal ohmic resistance of the fuel cell.

3 Claims, 6 Drawing Sheets

APPARATUS AND METHOD FOR MEASURING INTERNAL OHMIC RESISTANCE OF FUEL CELL SYSTEM

CROSS-REFERENCE TO RELATED APPLICATION

This application claims under 35 U.S.C. § 119(a) the benefit of Korean Patent Application No. 10-2013-0097065 filed the entire contents of which are incorporated herein by reference.

BACKGROUND (a) Technical Field

The present disclosure relates to an apparatus and a method for measuring the internal ohmic resistance of a fuel cell system, and more particularly, to an apparatus and a method for measuring the internal ohmic resistance of a fuel cell system, using a current interruption method even while the fuel cell system is being operated.

(b) Background Art

A fuel cell system mounted to fuel cell vehicles includes a fuel cell stack in which about tens to hundreds of fuel cells are stacked, a fuel supply system for supplying a fuel (hydrogen gas) to the fuel cell stack, an air supply system including an air blower and a humidifier for supplying oxygen gas in the air which is an oxidizer needed for an electrochemical reaction to the fuel cell stack, and a heat and water management system for controlling an operation temperature and cooling of the fuel cell stack.

When hydrogen gas is supplied to a fuel electrode (anode) of the fuel cell stack and air is supplied to an air electrode (cathode) of the fuel cell stack while the fuel cell system is being operated, an oxidation reaction of the hydrogen gas is conducted in the fuel electrode so that hydrogen ions (protons) and electrons are generated The generated hydrogen ions and electrons are moved to the air electrode through a polyelectrolyte membrane and a bipolar plate of the stack, water is generated in the air electrode through an electrochemical reaction in which the hydrogen ions and the electrons moved from the fuel electrode and oxygen gas of the air participate, and electric energy is generated by a flow of electrons at the same time.

The actual voltage according to the production of the electric energy of the fuel cell is determined as a value obtained by subtracting a loss due to an inner current of the fuel cell stack, a loss due to reaction activation of the stack, a loss due to an ohmic resistance within the stack, and a loss due to a delivery of reactants from an ideal voltage.

While the fuel cell system is operated, the polyelectrolyte membrane constituting a Membrane Electrolyte Assembly (MEA), and the air electrode (cathode) and the fuel electrode (anode) stacked on opposite surfaces thereof tend to deteriorate. Due to this deterioration, performance of the fuel cell is reduced after operation for a period of time. At this time, the internal ohmic resistance of the fuel cell is also varied depending on degree of deterioration of the stack.

The ohmic resistance of the fuel cell corresponds to configurations within the fuel cell stack which serve as a resistor according to Ohm's law, and is known to vary in magnitude depending on water moisture content of the membrane electrolyte assembly of the fuel cell, which includes the polyelectrolyte membrane and the air and fuel electrodes stacked on the opposite surfaces of the polyelectrolyte membrane.

Thus, the degree of deterioration of the fuel cell and the water moisture content within the membrane electrolyte assembly can be indirectly obtained through measurement of the internal ohmic resistance of the fuel cell.

A current interruption method and an alternating current impedance method may be exemplified as a typical method of measuring the internal ohmic resistance of the fuel cell according to the related art.

In the alternating current impedance method, an operational characteristic of the fuel cell is determined by measuring the resistance value of a cell at a specific alternating current frequency. By this method, separate hardware is required for generating an alternating current signal, and a significant amount of time is taken to measure the resistance.

Meanwhile, in the current interruption method, an operational characteristic of the fuel cell is determined through a slope characteristic of a voltage according to a time instantaneously appearing when a current is interrupted. For this, an analysis device is relatively simple, and a small amount of time is taken to measure the resistance as compared with the alternating current impedance method.

Hereinafter, a method of measuring an internal ohmic resistance of a fuel cell by using the current interruption method according to the related art will be described with reference to FIGS. 1 and 2.

Referring to FIG. 1, for measurement of the ohmic resistance through the current interruption method according to the related art, a fuel cell 10 is connected to a main energy consumption device 12 (for example, a driving motor of a fuel cell vehicle, or various electric loads) to apply a current, a separate voltage measurement device 14 is connected to the fuel cell 10, and an interrupter 16 (for example, a switch, a relay, an Insulated Gate Bipolar mode Transistor (IGBT), or the like) for applying or interrupting the current is connected between the fuel cell 10 and the main energy consumption device 12.

Referring to FIG. 2 showing an equivalent circuit of the fuel cell, representing a loss resistance for a voltage of the fuel cell, an activation loss resistance according to a reaction activation of the fuel cell and an internal ohmic resistance of the fuel cell are connected to each other in series, and a capacitor which is an activation loss resistance is connected in parallel to the activation loss resistance according to the reaction activation of the fuel cell.

For measurement of the internal ohmic resistance of the fuel cell while the loss resistances exist, the interrupter between the fuel cell and the main energy consumption device is switched off to interrupt current flowing from the fuel cell to the main energy consumption device.

When the current is instantaneously interrupted as described above, voltage corresponding to the ohmic resistance is instantaneously increased, and voltage corresponding to the activation loss resistance is also slowly increased through a discharge of electric charges stored in the capacitor. At this time, a voltage measurement device measures the voltage.

That is, the voltage measurement device measures the instantaneously increasing voltage $V_{ohmic}$ when the interrupter interrupts the current applied from the fuel cell to the main energy consumption device, and the ohmic internal resistance $R_{ohmic}$ of the fuel cell may be calculated by dividing the voltage $V_{ohmic}$ by the current I which the fuel cell has applied, as indicated by Equation 1.

$$R_{ohmic} = V_{ohmic}/I \qquad \text{Equation 1:}$$

The measured ohmic internal resistance is increased as the performance of the fuel cell is reduced by degree of deterioration or water moisture content in the membrane electrolyte assembly is decreased, and thus can be utilized as a barometer to indirectly indicate the deterioration degree and the moisture supply state of the fuel cell.

However, the above-described method of measuring the internal ohmic resistance of the fuel cell according to the related art has following problems.

When measuring the internal ohmic resistance of the fuel cell, current from the fuel cell to the main energy consumption device is interrupted when the interrupter between the fuel cell and the main energy consumption device is switched off, so that operation of the fuel cell system must be stopped.

That is, the fuel cell system cannot be continuously operated since the operation of the fuel cell system is instantaneously stopped for measurement of the internal ohmic resistance of the fuel cell.

SUMMARY OF THE DISCLOSURE

The present invention has been made in an effort to solve the above-described problems associated with the prior art. Accordingly, an aspect of the present invention is to provide an apparatus and a method for measuring the internal ohmic resistance of a fuel cell system, in which an interrupter and an external energy consumption device are connected in parallel to each other between a fuel cell and a main energy consumption device such that current for the external energy consumption device is applied and interrupted by switching on/off the interrupter even while the fuel cell system is maintained in operation, thereby making it possible to easily measure the internal ohmic resistance of the fuel cell.

In accordance with an aspect of the present invention, there is provided an apparatus for measuring the internal ohmic resistance of a fuel cell system, including: a fuel cell connected to a main energy consumption device to apply current to the main energy consumption device; and a voltage measurement device connected to the fuel cell, wherein an interrupter and an external energy consumption device are connected in parallel to each other between the fuel cell and the main energy consumption device.

The external energy consumption device may preferably include at least one of a resistor, a heater, a battery, and a capacitor, which consume energy of the fuel cell.

The interrupter may preferably include at least one of a switch, a relay, and an Insulated Gate Bipolar mode Transistor (IGBT), which interrupt a current.

In accordance with an aspect of the present invention, there is provided a method of measuring an internal ohmic resistance of a fuel cell system, including: connecting an interrupter and an external energy consumption device in parallel to each other between a fuel cell and a main energy consumption device; applying current from the fuel cell to the main energy consumption device; applying current from the fuel cell to the external energy consumption device by switching on the interrupter while current is applied from the fuel cell to the main energy consumption device; interrupting current applied from the fuel cell to the external energy consumption device, by switching off the interrupter after a predetermined period of time; and calculating the internal ohmic resistance by measuring an amount of variation in current and voltage that the fuel cell has applied to the external energy consumption device, as the interrupter is switched on and off.

The calculating of the internal ohmic resistance may preferably include dividing a difference value between the voltage applied by the fuel cell when the interrupter is switched on and the voltage applied by the fuel cell when the interrupter is switched off by a difference value between the current applied by the fuel cell when the interrupter is switched on and the current applied by the fuel cell when the interrupter is switched off.

As described above, according to the embodiment of the present invention, an internal ohmic resistance of a fuel cell can be easily measured while a fuel cell system is continuously operated without stopping, by connecting an interrupter and an external energy consumption device in parallel between the fuel cell and a main energy consumption device.

BRIEF DESCRIPTION OF THE DRAWINGS

The above and other features of the present invention will now be described in detail with reference to certain exemplary embodiments thereof illustrated the accompanying drawings which are given hereinbelow by way of illustration only, and thus are not limitative of the present invention, and wherein.

Figure 1:
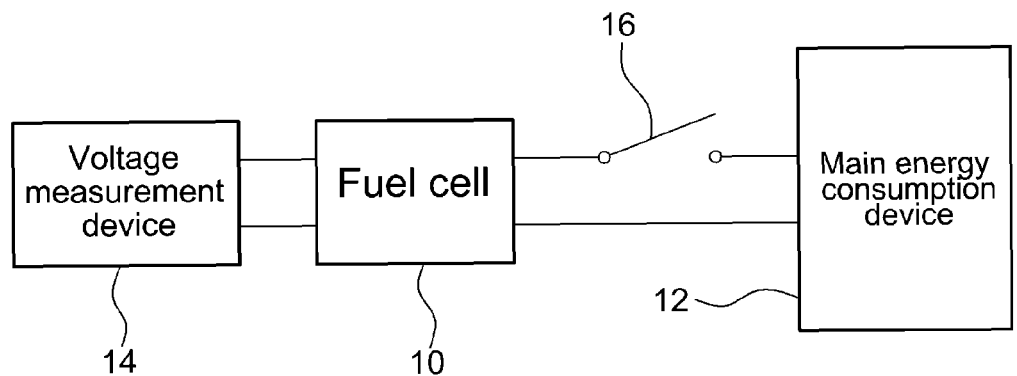
FIG. 1 is a view showing a configuration of an apparatus for measuring an internal ohmic resistance of a fuel cell system according to related art.
Figure 2:
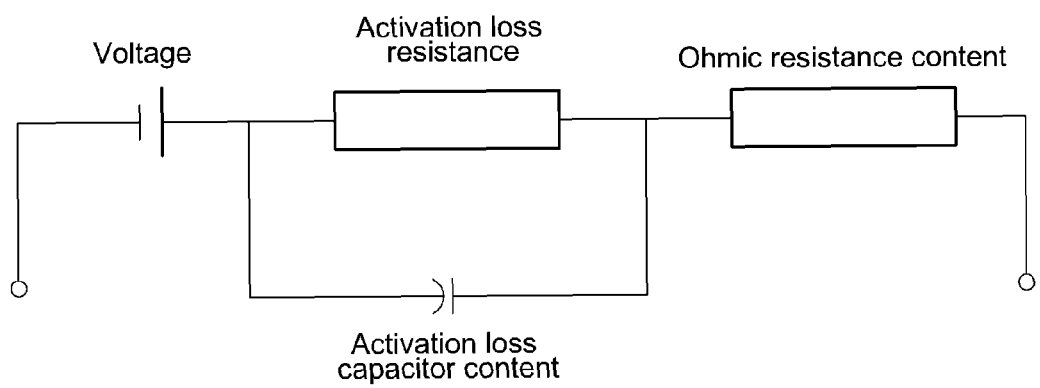
FIG. 2 is a circuit diagram showing an equivalent circuit of a fuel cell.

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Hereinafter, an exemplary embodiment of the present invention will be described in detail with reference to the accompanying drawings so that those skilled in the art to which the present invention pertains can easily carry out the invention.

The present invention is advantageous in that it enables the internal ohmic resistance of a fuel cell to be easily measured by using the current interruption method without stopping the operation of a fuel cell system.

Figure 3:
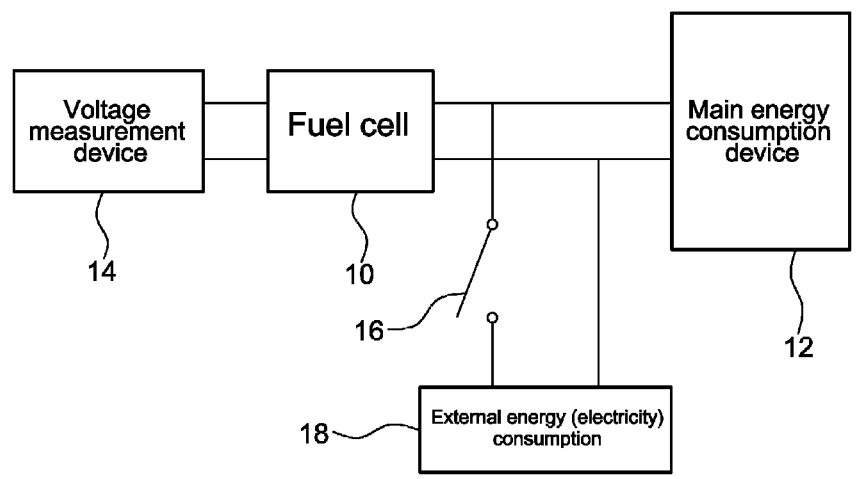
FIG. 3 is a view showing a configuration of an apparatus for measuring an internal ohmic resistance of a fuel cell system according to an embodiment of the present invention.

To this end, as shown in FIG. 3, an interrupter 16 and an external energy consumption device 18 are connected in parallel to each other between a fuel cell 10 and a main energy consumption device 12, such that the fuel cell 10 is connected to the main energy consumption device 12 (for example, a driving motor of a fuel cell vehicle, or various electrical loads) and a current can be applied; and a separate voltage measurement device is connected to the fuel cell 10.

The external energy consumption device 18 may preferably include any one or more selected from a resistor separately employed for the fuel cell system, a heater for the fuel cell system, and a battery and a capacitor for charging a generated current of the fuel cell system. In addition, the external energy consumption device 18 may include any device capable of consuming current supplied by the fuel cell.

Further, the interrupter 16 may include any one or more selected from an on/off switch, a relay, and an Insulated Gate Bipolar mode Transistor (IGBT). In addition, the interrupter 16 may include any unit for interrupting or applying an electrical signal.

Here, a method of measuring the internal ohmic resistance of a fuel cell system based on the above-described configuration will be described below.

When the interrupter 16 and the external energy consumption device 18 are connected in parallel to each other to a line through which the fuel cell 10 and the main energy consumption device 12 are directly connected to each other, current is normally applied from the fuel cell 10 to the main energy consumption device 18, and the fuel cell system is normally operated.

When measuring the internal ohmic resistance of the fuel cell while the fuel cell is being operated, the interrupter 16 is first switched on such that current is applied from the fuel cell 10 to the external energy consumption device 18, such that the external energy consumption device 18 as well as the main energy consumption device 12 consumes the current applied from the fuel cell.

At this time, since current and voltage are simultaneously applied by the fuel cell to the main energy consumption device 12 and the external energy consumption device 18 with the interrupter 16 switched on, the current of the fuel cell is changed from an applied current $I_{before}$ of the fuel cell, which is applied only to the main energy consumption device before the interrupter is switched on, to an applied current $I_{after}$ larger than the applied current $V_{before}$. Further, the voltage of the fuel cell is changed from an applied voltage $V_{before}$ of the fuel cell, which is applied only to the main energy consumption device before the interrupter is switched on, to an applied voltage $V_{after}$ smaller than the applied voltage $V_{before}$.

When a predetermined period of time (several microseconds to several seconds) passes after the interrupter 16 is switched on, the interrupter 16 is instantly switched off to interrupt the current of the fuel cell applied to the external energy consumption device 18.

At this time, as the current to the external energy consumption device 18 is interrupted, the current of the fuel cell is again changed from the applied current $I_{after}$ to the original applied current $I_{before}$, and the voltage of the fuel cell is also again changed from the applied voltage $V_{after}$ to the original applied voltage $V_{before}$.

Figure 4:
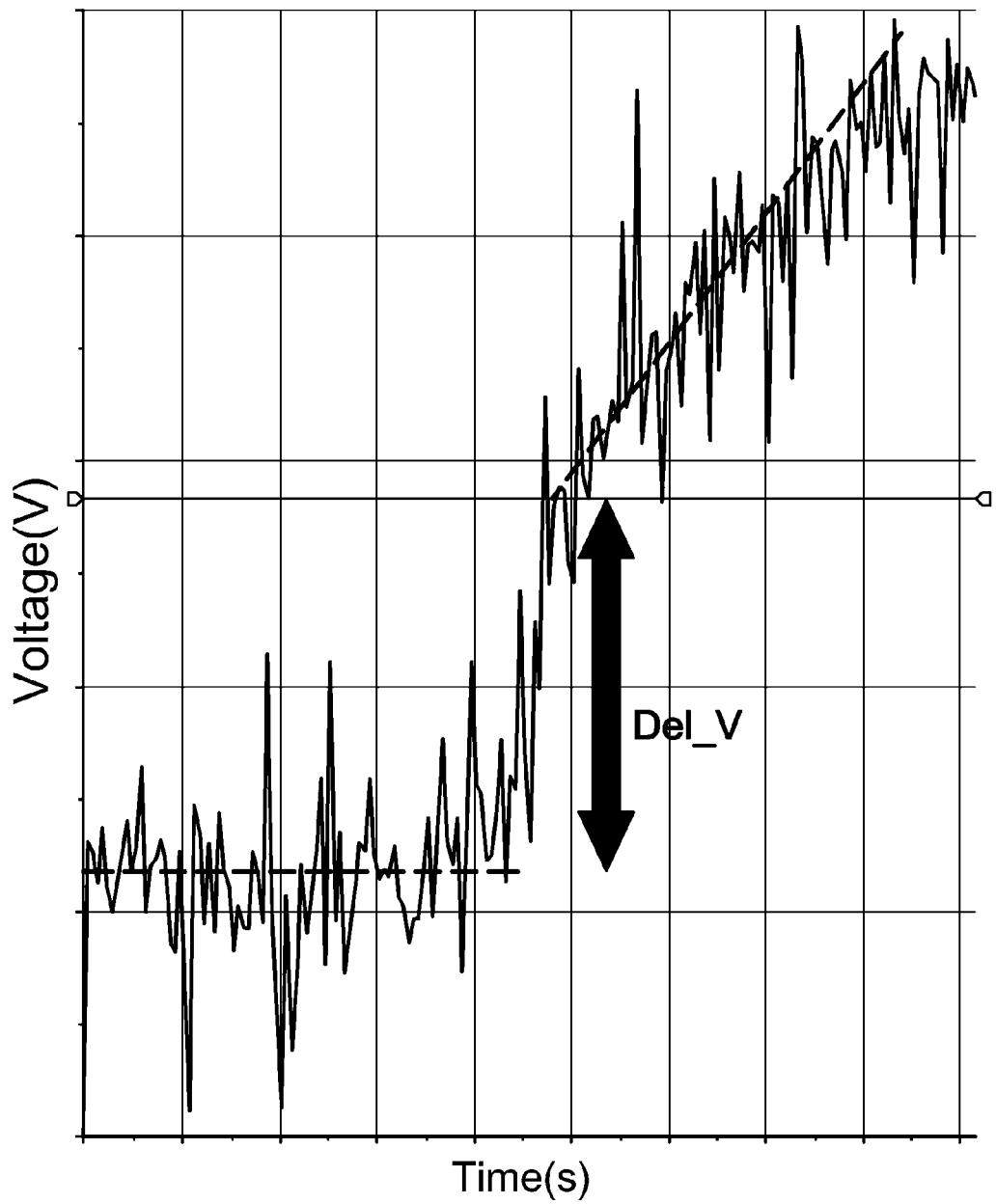
FIG. 4 is a graph showing a variation in an applied voltage of a fuel cell depending on time, in a case of measuring an internal ohmic resistance of a fuel cell system according to an embodiment of the present invention.

When the interrupter 16 is switched from the on-state to the off-state, the applied voltage of the fuel cell instantly increases as indicated by Del_V of FIG. 4.

As the interrupter 16 is switched on and off, the internal ohmic resistance $R_{ohmic}$ may be calculated through Equation 2, by measuring amounts of variation in the applied current and the applied voltage of the fuel cell 10 for the external energy consumption device 18.

$$R_{ohmic}=\text{Del\_}V/(I_{after}-I_{before})$$  Equation 2:

That is, the internal ohmic resistance of the fuel cell is calculated by dividing a difference value ($V_{after}-V_{before}=\text{Del\_}V$) between the applied voltage $V_{after}$ of the fuel cell in the on-state of the interrupter and the applied voltage $V_{before}$ of the fuel cell in the off-state of the interrupter by a difference value ($I_{after}-I_{before}$) between the applied current $I_{after}$ of the fuel cell in the on-state of the interrupter and the applied current $I_{before}$ of the fuel cell in the off-state of the interrupter.

In this way, the interrupter 16 and the external energy consumption device 18 are connected in parallel to each other between the fuel cell 10 and the main energy consumption device 12 so that the internal ohmic resistance of the fuel cell can be easily measured by using the current interruption method even while the fuel cell system is continuously operated without stopping.

Figure 5:
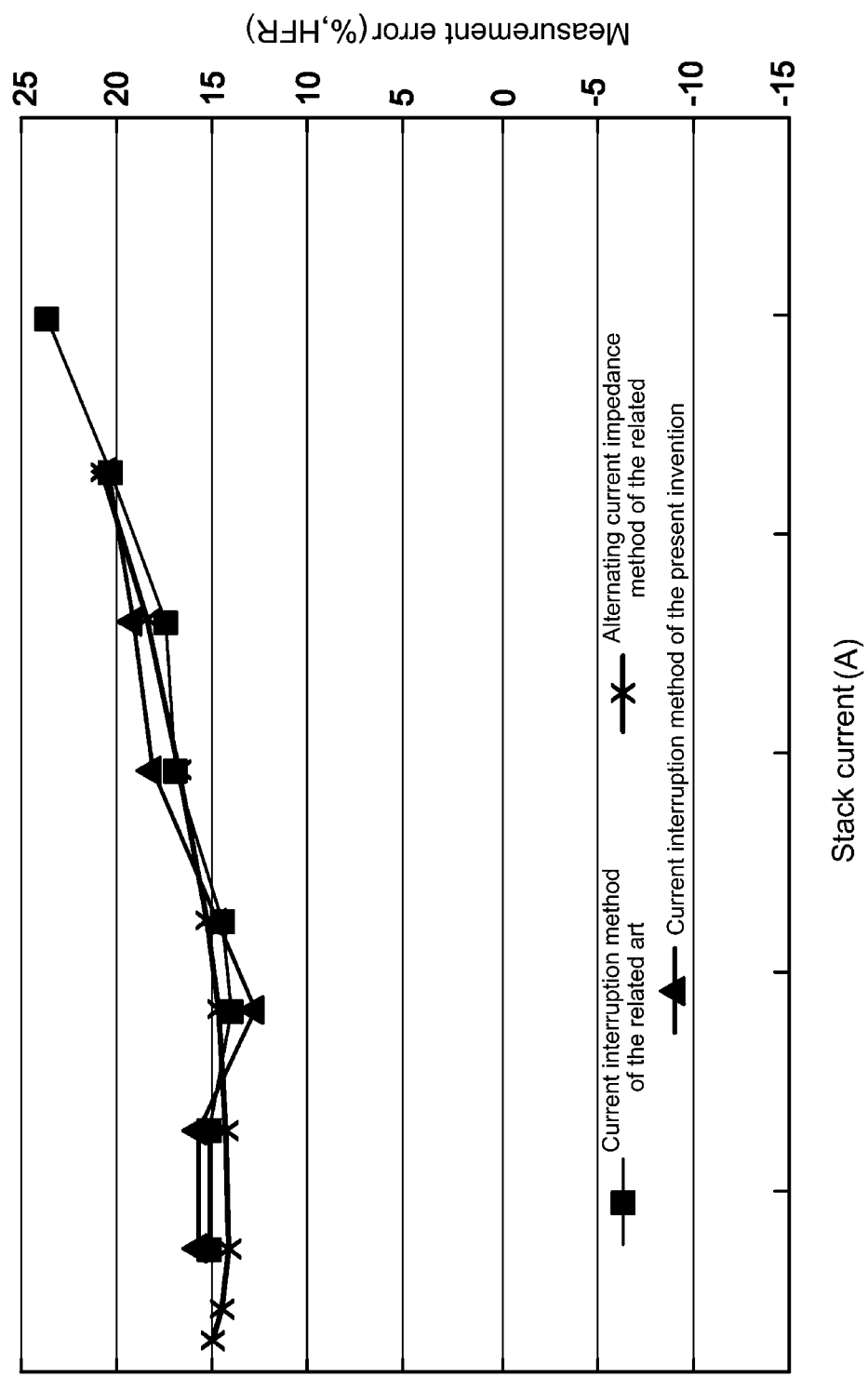
FIG. 5 is a graph showing ohmic resistances measured through methods according to the related art and the present teaching.

FIG. 5 is a graph showing ohmic resistances measured through the current interruption method and the alternating current impedance method according to the related art and the current interruption method according to an embodiment of the present invention.

As shown in FIG. 5, in the entire current area, the ohmic resistances measured through the current interruption method according to the related art and the current interruption method according to the present invention are similar to those measured through the alternating current impedance method, which is a general basis, according to the related art, which proves that the internal ohmic resistance of the fuel cell can be easily measured even while the fuel cell system is operated.

Figure 6:
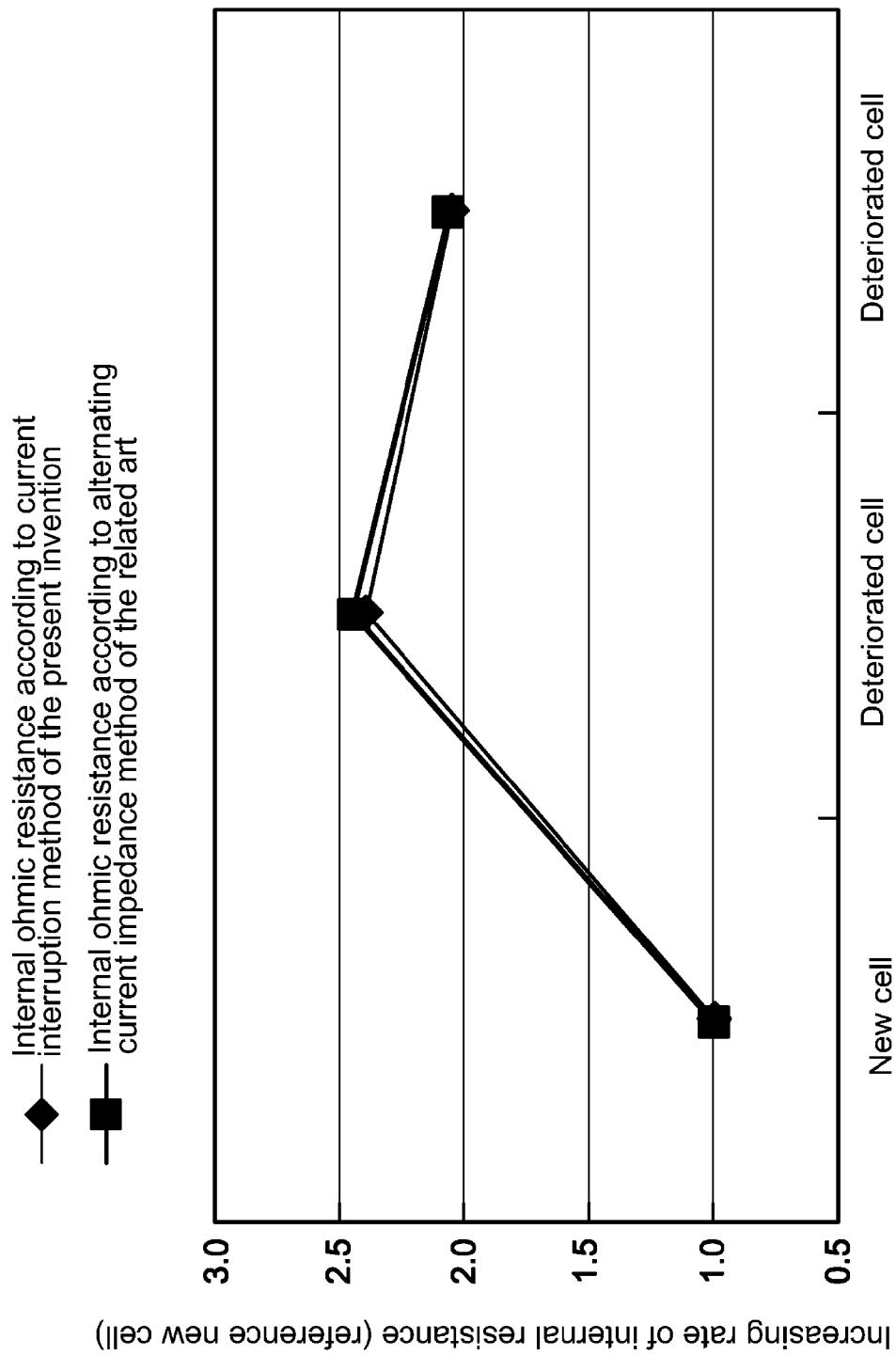
FIG. 6 is a graph showing that ohmic resistances measured through methods according to the related art and the present teaching are increased depending on a deterioration degree of a fuel cell.

FIG. 6 is a graph showing that ohmic resistances measured through methods according to the related art and the present invention are increased depending on degree of deterioration of a fuel cell.

As shown in FIG. 6, the internal ohmic resistance of the fuel cell increases as deterioration of the fuel cell progresses, and an increasing rate of the internal ohmic resistance according to increase in fuel cell deterioration measured by existing expensive equipment for measuring alternating current impedance is similar to an increasing rate of the internal ohmic resistance measured by using the current interruption method according to the present invention.

Accordingly, the degree of deterioration of the fuel cell is indirectly determined by measuring the internal ohmic resistance of the fuel cell through the current interruption method according to the present invention, so that a reference point that can optimize an operation condition of the fuel cell can be apprehended.

Figure 7:
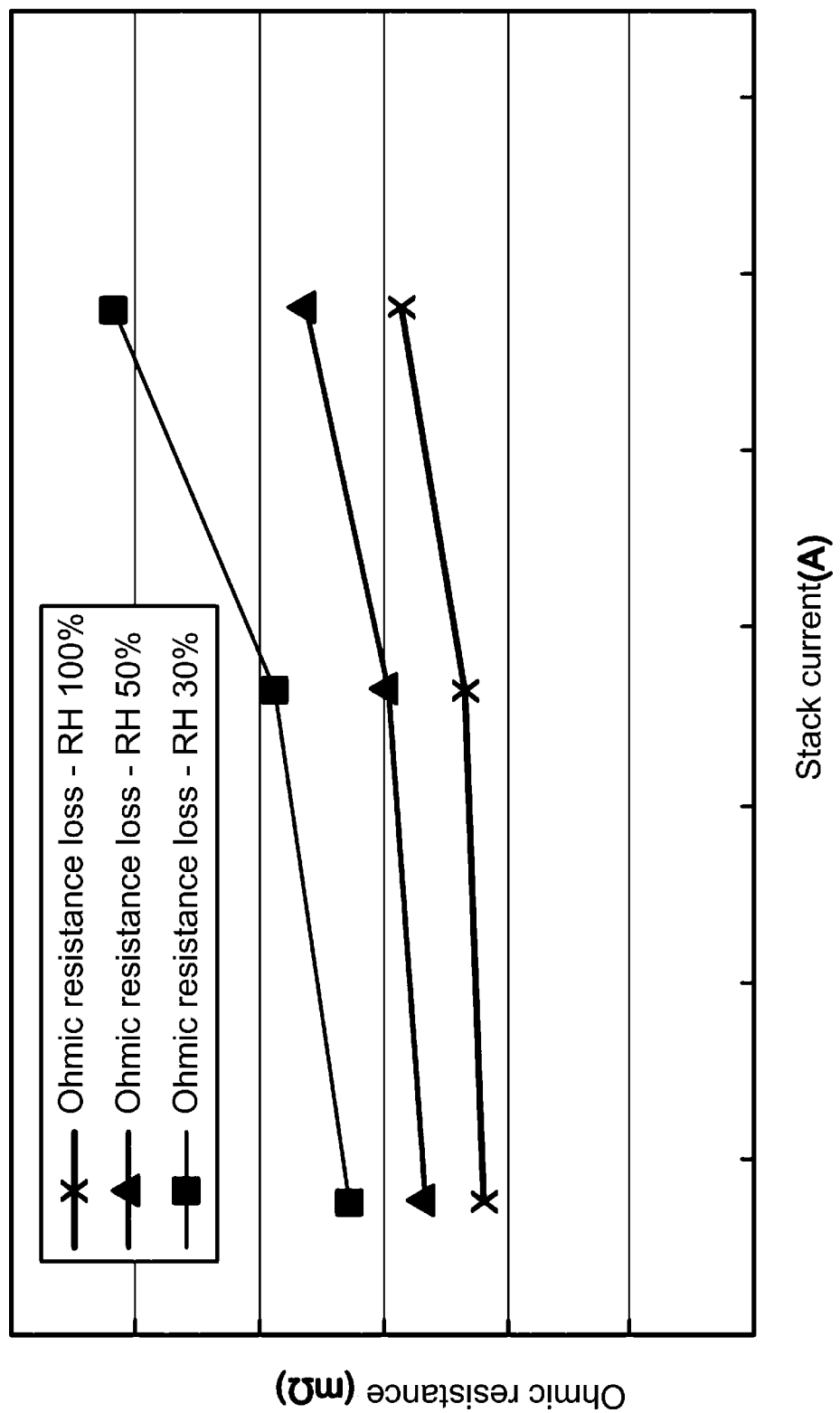
FIG. 7 is a graph showing that an ohmic resistance measured through a method according to an embodiment of the present invention is varied depending on relative humidity of a fuel cell.

FIG. 7 is a graph showing that ohmic resistance measured by a method according to the present invention is varied depending on a relative humidity of a fuel cell.

As shown in FIG. 7, the higher the relative humidity of the membrane electrolyte assembly in the fuel cell, the smaller the internal ohmic resistance of the fuel cell. Thus, it can be seen that the higher the relative humidity, the smaller the ohmic resistance measured by using the current interruption method according to the present invention.

Thus, according to the related art, water moisture content of the membrane electrolyte assembly of the fuel cell is indirectly predicted by measuring the relative humidity of air. However, since it is possible to directly know the internal water moisture content of the fuel cell by measuring the ohmic resistance using the current interruption method according to the present invention, the present invention can be utilized as a standard of driving logic when the fuel cell vehicle is driven.

The invention has been described in detail with reference to preferred embodiments thereof. However, it will be appreciated by those skilled in the art that changes may be made in these embodiments without departing from the principles and spirit of the invention, the scope of which is defined in the appended claims and their equivalents.

What is claimed is:

1. An apparatus for measuring an internal ohmic resistance of a fuel cell system, the apparatus consisting essentially of:
    a fuel cell connected to a main energy consumption device to apply a current to the main energy consumption device;
    a voltage measurement device connected to the fuel cell; and
    an interrupter and an external energy consumption device that are connected in series to each other,
    wherein only the interrupter and the external energy consumption device are connected to the fuel cell and the main energy consumption device between the fuel cell and the main energy consumption device, and
    wherein the external energy consumption device is formed with one of a resistor, a heater, a battery, or a capacitor, which consumes energy of the fuel cell.

2. The apparatus of claim 1, wherein the interrupter comprises at least one of a switch, a relay, and an Insulated Gate Bipolar mode Transistor (IGBT), which interrupts current.

3. An apparatus for measuring an internal ohmic resistance of a fuel cell system, the apparatus comprising:
    a fuel cell connected to a main energy consumption device to apply a current to the main energy consumption device;
    a voltage measurement device connected to the fuel cell; and
    an interrupter and an external energy consumption device that are connected in series to each other,
    wherein only the interrupter and the external energy consumption device are connected to the fuel cell and the main energy consumption device between the fuel cell and the main energy consumption device, and
    wherein the apparatus for measuring an internal ohmic resistance of a fuel cell system includes a controller, and the controller is programmed to calculate the internal ohmic resistance $R_{ohmic}$ through Equation 1, by measuring amounts of variation in the applied current and the applied voltage of the fuel cell for the external energy consumption device, $$R_{ohmic} = Del\_V / (I_{after} - I_{before}), \qquad \text{Equation 1:}$$

where $Del\_V = (V_{after} - V_{before})$ is a difference value between the applied voltage $V_{after}$ of the fuel cell in the on-state of the interrupter and the applied voltage $V_{before}$ of the fuel cell in the off-state of the interrupter, and $(I_{after} - I_{before})$ is a difference value between the applied current $I_{after}$ of the fuel cell in the on-state of the interrupter and the applied current $I_{before}$ of the fuel cell in the off-state of the interrupter.

* * * * *